US008675539B1

(12) United States Patent
Ngo

(10) Patent No.: US 8,675,539 B1
(45) Date of Patent: Mar. 18, 2014

(54) MANAGEMENT-PACKET COMMUNICATION OF GPS SATELLITE POSITIONS

(75) Inventor: Terry F K Ngo, Bellevue, WA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 12/840,155

(22) Filed: Jul. 20, 2010

Related U.S. Application Data

(60) Provisional application No. 61/332,640, filed on May 7, 2010.

(51) Int. Cl.
*H04H 20/71* (2008.01)

(52) U.S. Cl.
USPC ........................................ 370/312; 455/456.6

(58) Field of Classification Search
USPC ............. 370/310–350; 455/404.2, 456.1–457
See application file for complete search history.

(56) References Cited

U.S. PATENT DOCUMENTS

| | | | |
|---|---|---|---|
| 6,108,558 A | 8/2000 | Vanderspool | |
| 6,801,782 B2 | 10/2004 | McCrady et al. | |
| 7,057,557 B2 | 6/2006 | Lee | |
| 7,065,369 B2 | 6/2006 | Tang et al. | |
| 7,215,966 B2 | 5/2007 | Joshi | |
| 7,574,216 B2 | 8/2009 | Leitch et al. | |
| 7,800,531 B2 | 9/2010 | Wang et al. | |
| 7,877,100 B2 | 1/2011 | Rick et al. | |
| 8,026,850 B2 | 9/2011 | Seong et al. | |
| 8,160,609 B2 | 4/2012 | Alles et al. | |
| 8,184,038 B2 | 5/2012 | Ekbal et al. | |
| 8,233,457 B1 | 7/2012 | Chen et al. | |
| 8,335,173 B2 | 12/2012 | Hart et al. | |
| 8,370,629 B1 | 2/2013 | Ngo et al. | |
| 2002/0194266 A1* | 12/2002 | Brebner et al. | ............... 709/203 |
| 2003/0103475 A1 | 6/2003 | Heppe et al. | |
| 2003/0118015 A1 | 6/2003 | Gunnarsson et al. | |
| 2005/0124319 A1 | 6/2005 | Williams et al. | |
| 2005/0124355 A1* | 6/2005 | Cromer et al. | ............. 455/456.5 |
| 2006/0052115 A1* | 3/2006 | Khushu | ...................... 455/456.3 |
| 2006/0148486 A1 | 7/2006 | Kim et al. | |
| 2007/0025296 A1 | 2/2007 | Jung et al. | |
| 2007/0103303 A1 | 5/2007 | Shoarinejad | |
| 2007/0121560 A1 | 5/2007 | Edge | |
| 2007/0276583 A1 | 11/2007 | Dobeck et al. | |
| 2008/0109885 A1* | 5/2008 | Sim et al. | .......................... 726/5 |
| 2008/0291883 A1* | 11/2008 | Seok | ............................. 370/338 |
| 2009/0079622 A1* | 3/2009 | Seshadri et al. | ........... 342/357.1 |

(Continued)

FOREIGN PATENT DOCUMENTS

| | | | |
|---|---|---|---|
| EP | 0320913 A2 | 6/1989 | |
| EP | 1253437 A2 | 10/2002 | |
| EP | 1587255 A1 | 10/2005 | |
| WO | WO 2005/006593 A1 | 1/2005 | |

*Primary Examiner* — Ricky Ngo
*Assistant Examiner* — Wei-Po Kao
(74) *Attorney, Agent, or Firm* — Mahamedi Paradice Kreisman LLP

(57) ABSTRACT

Methods are disclosed for management-packet communication using management frames between various combinations of stations and access points to share application data, for example, a GPS ephemeris and/or its position data for at least one GPS satellite. The management-packet communications may push the application data, or operate in a pull mode based upon availability and requests. The methods may use infrastructure messaging and/or ad hoc or peer to peer messaging schemes. The apparatus supporting these methods include embodiments of integrated circuits, processors, program systems, installation packages, computer readable memories and servers.

19 Claims, 3 Drawing Sheets

(56) References Cited

U.S. PATENT DOCUMENTS

| | | | |
|---|---|---|---|
| 2009/0093956 A1* | 4/2009 | Wu et al. | 701/213 |
| 2009/0121927 A1* | 5/2009 | Moshfeghi | 342/357.03 |
| 2009/0224967 A1 | 9/2009 | Wang et al. | |
| 2010/0135178 A1 | 6/2010 | Aggarwal et al. | |
| 2012/0269170 A1 | 10/2012 | Chen et al. | |

* cited by examiner

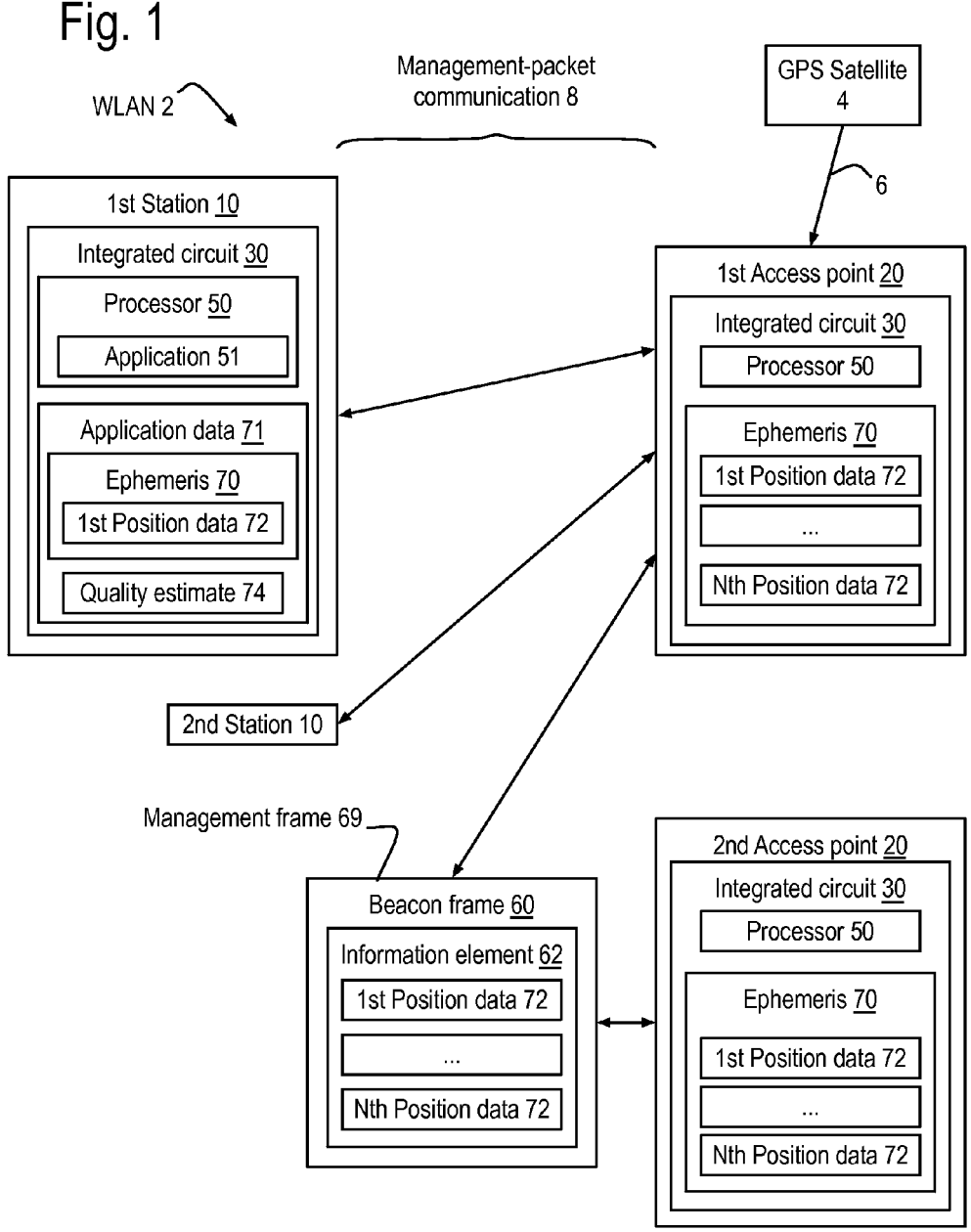

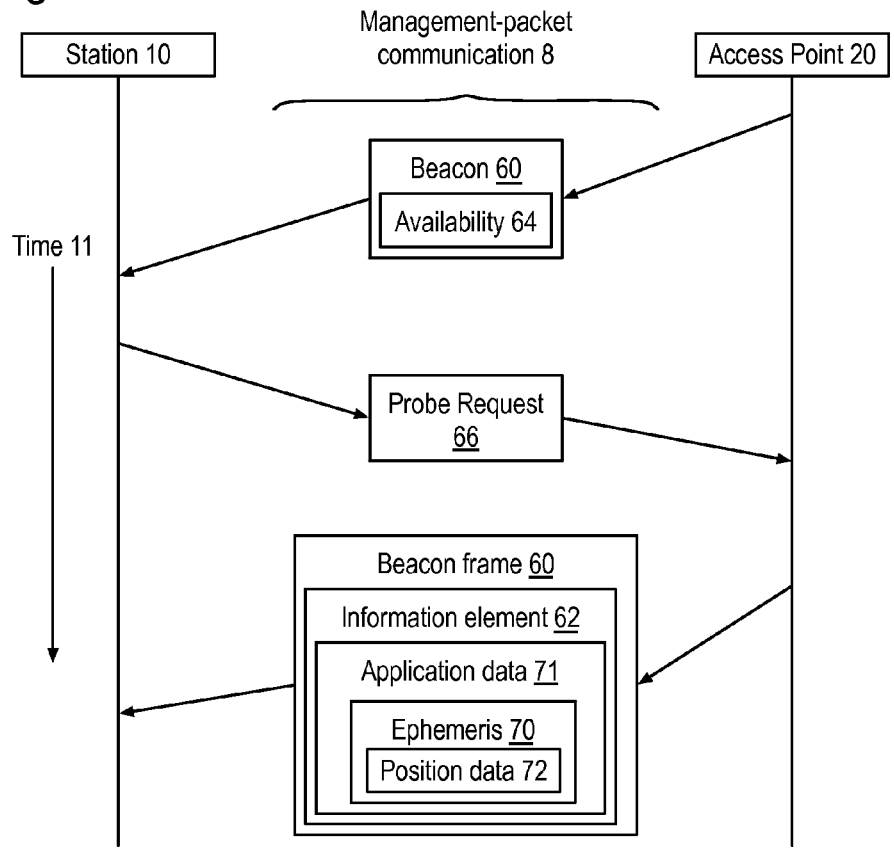
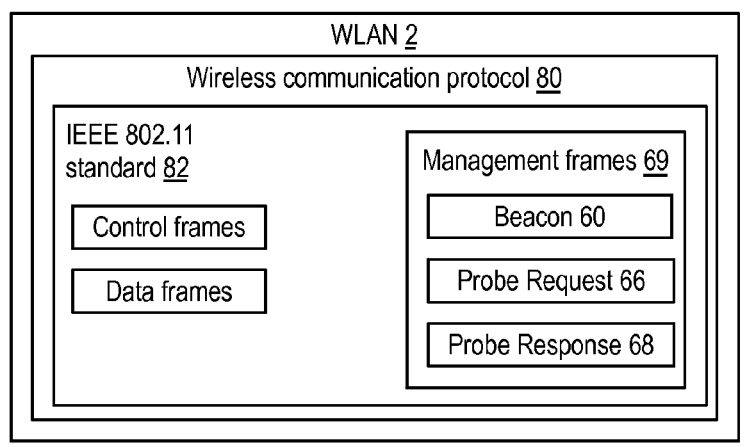

MANAGEMENT-PACKET COMMUNICATION OF GPS SATELLITE POSITIONS

CROSS-REFERENCE TO RELATED APPLICATION

This application claims the benefit of the priority date of the U.S. provisional patent application Ser. No. 61/332,640, filed May 7, 2010 entitled Management-Packet Communications of GPS Satellite Positions, which is hereby incorporated by reference in its entirety.

TECHNICAL FIELD

This invention relates to dissemination of application data, in particular Global Positioning System (GPS) ephemeris position data about GPS satellites, through management-packet communication using Wireless Local Area Networks (WLAN).

BACKGROUND OF THE INVENTION

The reception of GPS satellite position data, used to create a position data (i.e., ephemeris data) in hybrid GPS/WLAN devices, may have problems indoors and in urban canyons. There is a need to wirelessly communicate such application data in coverage problem areas. Most, but not all, wireless communication in a WLAN is done by connection between an access point and stations. It would seem natural to consider connection-based solutions to these coverage problems.

Connection-based solutions for Assisted GPS (A-GPS) for GPS/WLAN devices exist, often disseminating the ephemeris via an (Internet Protocol) IP network from a server. They tend to be inconvenient, requiring the user to connect to a wired network in the home or office, or to use a wireless broadband connection in the home, office, or a hotspot. Many people do not have subscriptions. And explicit connection and download are cumbersome and time consuming.

Another connection-based solution is A-GPS via cellular Secure User Plane Location (SUPL) connection requiring cellular network subscription with tariffs, adding cost. This typically limits A-GPS capability to a single device (usually the user's personal phone) that is not available to the user's other devices, which may not have cellular network capability.

These connection-based solutions often rely on a web-based assistance server that is vulnerable to loss of connection to the server, web attacks on the server such as denial of service, and/or server failure through the financial insolvency of the server provider. Such connections usually require access permission, often involving log-on and/or an authentication processes.

SUMMARY OF THE INVENTION

Application data, such as an ephemeris of Global Positioning System (GPS) satellite positions, may be shared, without connection to a Wireless Local Access Network (WLAN), by management-packet communication between a station near an access point, and/or between access points, and/or between stations. The WLAN may be compatible with at least one wireless communication protocol that may comply with a version of an Institute for Electrical and Electronic Engineers (IEEE) 802.11 standard.

Management-packet communication of application data uses only management frames or packets to wirelessly communication the application data. It does not use standard connection based communications. The station does not need to connect or even know there is an access point nearby. The transfer of the application data requires no log-on, no authentication, no access permission and no need for the Internet. A station passing close to the access point suffices to transfer the ephemeris.

Two basic approaches may be implemented, a push and a pull approach. The push approach communicates the application data without a request. The pull approach first communicates a request and then communicates the application data in response to the request. The receiving device, whether an access point or a station, may respond with its application data if the beacon makes the request or with a request for the application data, if the beacon notes its availability.

An integrated circuit may support management-packet communications with a processor configured to support the WLAN and use management frames to communicate application data. The integrated circuit may be part of the access point and/or of the station. The processor may be further configured to use a beacon frame and/or its Information Element to communicate the application data, its availability, and/or request the application data.

The processor may include at least one instance of a finite state machine, a computer and/or a computer accessible memory configured for access by the computer to retrieve a program system to perform management-packet communication. Other embodiments include a computer readable memory and/or a server configured to communicate the program system and/or an installation package for installing the program system.

BRIEF DESCRIPTION OF THE DRAWINGS

FIG. 1 shows a simplified block diagram of a Wireless Local Access Network (WLAN) using the push approach to management-packet communication to share application data such as an ephemeris of position data for at least one Global Positioning System (GPS) satellite among at least one station and/or at least one access point.

FIG. 2 shows a transaction diagram of the pull approach to management-packet communication between a station and an access point of FIG. 1.

FIG. 3 shows that the WLAN may be compatible with at least one wireless communication protocol that may in some cases be a form of the IEEE 802.11 standard.

DETAILED DESCRIPTION

Figure 4:
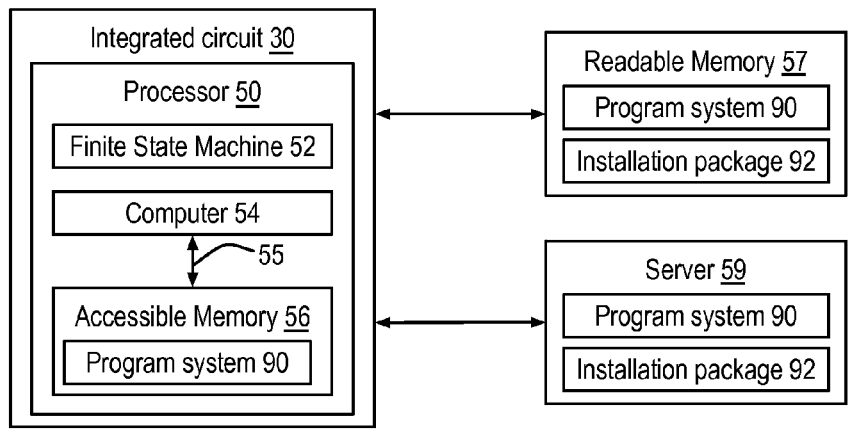
FIG. 4 shows the processor may include at least one finite state machine, computer and/or computer accessible memory configured for access by the computer to retrieve a program system instructing the processor to perform management-packet communication. It also shows a computer readable memory and/or a server configured to communicate the program system and/or an installation package.

This invention relates to dissemination of application data, in particular, Global Positioning System (GPS) ephemeris position data about GPS satellites through management-packet communication using Wireless Local Area Networks (WLAN). As will be described below, in one embodiment, management-packet communication may occur without connecting to the WLAN. The ephemeris may be shared using the WLAN by performing management-packet communication between a station near an access point, and/or between a first and a second access point, and/or between a first and a second station. Management-packet communication may use only the management packets or frames of a wireless communications protocol employed by the WLAN. This use may involve only a part of the management frame, such as the information element of a beacon frame.

Referring to the drawings more particularly by reference numbers, FIG. 1 shows an example embodiment of the invention that may operate a WLAN 2 to share application data 71 that may include an ephemeris 70 of Global Positioning System (GPS) satellite 4 position data 72 by performing management-packet communication 8 between a station 10 near an access point 20, and/or between a first and a second of the access points 20, and/or between a first and a second of the stations 10. In this specification, the term "connection-based communication" may be used to refer to traditional communication typically between an access point and a station. Such communications generally rely upon the station associating with the access point. The act of association may provide permission and/or establish a connection for the station to access and otherwise use a network connection though the access point.

Management-packet communication 8 of the application data 71 may not use typical connection-based communications. The station 10 may not need to connect to a nearby access point 20. The transfer of the application data 71 requires no log-on, no authentication, no access permission and no need for access to the Internet. A station 10 passing close to the access point 20 suffices to transfer the ephemeris 70.

Management-packet communication 8 may be supported by an integrated circuit 30 including a processor 50 configured to support the WLAN 2 and use a management frame 69, such as a beacon frame 60 for management-packet communication 8. The processor 50 may be configured to operate an application 51 based upon the application data 71. The application 51 may be a form of GPS enabled navigator and/or use a GPS position. The integrated circuit 30 may be part of the access point 20 and/or of the station 10. The processor 50 may be further configured to use an Information Element 62 in the beacon frame 60 to perform management-packet communication 8 the application data 71, the availability of the application data, and/or the request for the application data.

The first access point 20 has received 6 the position data 72 for the GPS satellite 4 as shown in FIG. 1. The access point 20 may use and/or include a GPS receiver. In other situations, the access points 20 may be blocked from such receptions and may rely on one or more of the stations 10 receiving 6 the position data 72 for the GPS satellite 4 and to perform management-packet communication 8 of the position data 72 with them. In an alternative embodiment, the access point 20 may be connected to an alternative source of the application data 71, such as a source of the ephemeris 70 available through the Internet.

The application data 71 may also include a quality estimate 74 that may indicate whether the ephemeris 70 and/or the position data 72 was directly received 6 from the GPS satellite 4. The quality measure 74 may also indicate how many transfers have been made since the data was received 6 from the GPS satellite 4. The quality estimate 74 may also indicate whether the original source of the GPS position data 72 and/or the ephemeris 70 may be from the Internet, possibly indicating the source on the Internet.

The application data 71 may include an estimate of the time in a local time zone and/or an estimate of a standard time such as Greenwich Mean Time and/or an estimate of a network time used in a WLAN and/or LAN. Similarly the application data 71 may include a location estimate that may or may not be derived from GPS position data 72 or the ephemeris 70.

An example of a push approach to management-packet communication 8 is shown in FIG. 1, since the ephemeris 70 is always made available (i.e., "pushed") though one or more beacon frames 60 without the necessity of a request. In other embodiments, the ephemeris 70 may be pushed by a probe request from a station 10 to the access point 20. In yet other situations, when an ad hoc or peer to peer situation exists, there are no nearby access points 20, and one of the stations 10 is temporarily acting to send the beacon 60, that station 10 may push the application data 71, and/or the ephemeris 70, and/or the position data 72. In contrast, a pull approach is illustrated in FIG. 2.

FIG. 2 shows a transaction diagram of the pull approach performing management-packet communication 8 as transactions through time 11 between an access point 20 and a station 10. The station 10 may initiate a management-packet communication 8 by sending a probe request 66 to the access point 20. The access point 20 may perform management-packet communication 8 by sending the ephemeris 70 to the station 10 in response to the request 66. The request 66 may be sent in response to the access point 20 sending a beacon frame 60 including an availability 64 of the ephemeris 70 and/or the specific position data 72 for one or more of the GPS satellites 4. In one embodiment, these transactions may occur when the station 10 notes that its position data 72 and/or ephemeris 70 for the GPS satellite 4 has aged, expired or may otherwise be inaccurate.

The availability information 64 of the ephemeris 70 may be indicated within a beacon frame 60. The ephemeris 70 and/or the position data 72 may be sent in information elements 62 included in one or more of the beacon frames 60.

In alternative embodiments, the pull approach may occur between two stations 10 or two access points 20 with a similar transaction diagram to that shown in FIG. 2. The transactions between two of the stations 10 may occur in an ad hoc or peer to peer situation when one of these stations is transmitting the beacons 60.

FIG. 3 shows the WLAN 2 may be compatible with at least one wireless communication protocol 80 that may be compliant with a version of an Institute for Electrical and Electronic Engineers (IEEE) 802.11 standard 82. The wireless communications protocol 80 may include control frames and application data frames that may not used directly in management-packet based communication. The management-packet communications may use some or all of the management frames 69, which may include, but are not limited to, versions of the beacon frame 60, the probe request 66 and/or a probe response 68.

Before proceeding, some background in the Open System Interconnection (OSI) model of communications is useful. Communications in the IEEE 802 family of standards are based upon the OSI model, which has seven layers, of which the following are relevant: the physical (second from the bottom) layer, the presentation (sixth) layer and the application (seventh and highest) layer. The physical layer typically deals with messaging conventions of the wireless communication protocol 80. The presentation layer normally provides the communication context for the sharing of the application data 71 for the applications 51 on the application layer. Management-packet communication 8 essentially moves the sharing of the application data 71 down to the physical layer, below the level of connection-based communications.

To summarize some of the preceding discussion, management-packet communication 8 may be supported by the integrated circuit 30 including the processor 50 configured to support the WLAN 2 and the management-packet communication 8. The integrated circuit 30 may be part of the access point 20 and/or of the station 10 as shown in FIG. 1. The processor 50 may be further configured to use the beacon frame 60 and/or its Information Element 62 for management-packet communication 8 of the application data 71, the availability 64 of the application data, and/or the request 66 for the application data as shown in FIGS. 1 and/or 2.

FIG. 4 shows the processor 50 may include at least one instance of a finite state machine 52, a computer 54 and/or a computer accessible memory 56 configured for access 55 by the computer 54 to retrieve a program system 90 to instruct the computer 54 to support management-packet communication 8. This Figure also shows a computer readable memory 57 and/or a server 59 configured to communicate the program system 90 and/or an installation package 92 to the integrated circuit 30. The installation package 92 instruct the computer 54 to install the program system 90 in the computer accessible memory 56 and/or to configure the finite state machine 52.

As used herein, the computer 54 may include at least one instruction processor and at least one data processor, with at least one of the data processors instructed by at least one of the instruction processors to at least partly implement management-packet communication 8 using the program system 90. These operations may be at least partly illustrated the program steps of FIG. 5. These program steps may reside in the computer accessible memory 56, which may include volatile and/or non-volatile memory components.

Figure 5:
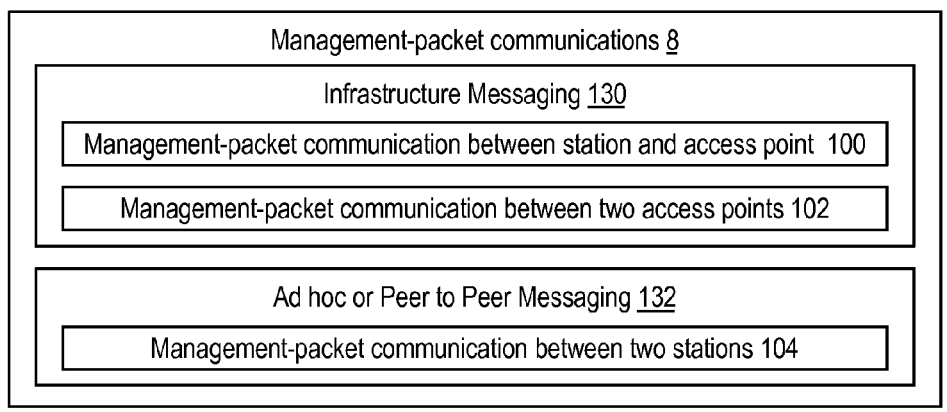
FIG. 5 shows some details of the program system of FIG. 4 implementing management-packet communication.

FIG. 5 shows some details of the program system 90 instructing the processor 50 in terms that may disclose flow of control, state transitions and/or position data. These embodiments may include a program operation, or program thread, executing upon the computer 54 or states of the finite state machine 52. Each of these program steps may at least partly support the operation to be performed. The operation of starting may involve entering a subroutine or a macroinstruction sequence in the computer or of a possibly initial state or condition of the finite state machine. The operation of termination may complete those operations, which may result in a subroutine return in the computer, or possibly return the finite state machine to a previous condition or state.

FIG. 5 shows the program system 90 may support management-packet communications 8 in terms of infrastructure messaging 130 and/or ad hoc messaging 132. The infrastructure messaging 130 may be implemented based upon the management-packet communications 100 between the station 10 and the access point 20 of FIGS. 1 and 2 and/or the management-packet communications 102 between two of the access points 20. The ad hoc messaging 132 may be implemented based upon the management packet communication 104 between two of the stations 10.

As used herein, ad hoc or peer to peer messaging 132 occurs when there is no access point 20 available to direct the WLAN 2 communications between those stations 10. Most implementations of ad hoc messaging involve the stations 10 each temporarily acting as an access point 20 by sending the beacon frame 60. This station 10 will be referred to as an access station. The other stations 10 may respond with probe requests 66 and the temporary access station 10 may respond to those probe requests 66, possibly with the next beacon frame 60, creating similar exchanges to those shown and discussed earlier regarding FIGS. 1 and 2.

The program system 90 may include at least one of the following: Program step 100 supporting management-packet communication 8 between at least one of the stations 10, and at least one of the access points 20. Program step 102 supporting management-packet communication 8 between two access points 20. Program step 104 supporting management-packet communication 8 between two of the stations 10. Any of these program steps may further support sharing the ephemeris 70 and/or the position data 72. Support for management-packet communication 8 as found in at least one of these program steps may include management-packet communication 8 in the push mode illustrated in FIG. 1 and/or management-packet communication 8 in the pull mode illustrated in FIG. 2.

The program system 90 may support operating the integrated circuit 30 of FIG. 4 as part of the station 10 and/or support operating the integrated circuit 30 as part of the access point 20.

The preceding embodiments provide examples and are not meant to constrain the scope of the following claims.

What is claimed is:

1. An integrated circuit, comprising:
a processor configured to support a Wireless Local Access Network (WLAN) and configured to use the WLAN to communicate a management-packet frame from a wireless access point to a mobile station without an established connection between the wireless access point and the mobile station, wherein the management-packet frame contains position data of a Global Positioning System (GPS) satellite and contains a quality estimate of the position data, wherein the quality estimate indicates whether the position data is received directly from the GPS satellite, and wherein the quality estimate indicates a number of data transfers, including at least one or more of the management-packet frames, from the wireless access point to the mobile station since reception of the position data from the GPS satellite by the wireless access point.

2. The integrated circuit of claim 1, wherein said WLAN is compliant with a wireless communication protocol.

3. The integrated circuit of claim 2, wherein the wireless communication protocol is compliant with a version of an Institute for Electrical and Electronic Engineers (IEEE) 802.11 standard.

4. The integrated circuit of claim 1, wherein the management-packet frame comprises a beacon frame.

5. The integrated circuit of claim 4, wherein the beacon frame includes an Information Element to store the position data.

6. The integrated circuit of claim 1, wherein said processor includes at least one instance of at least one member of the group consisting of:
a finite state machine,
a computer, and
a computer accessible memory configured to be accessed by said computer to retrieve a program system to instruct said computer to communicate the management-packet frame.

7. An integrated circuit, comprising:
a processor; and
a non-transitory computer readable memory coupled to the processor and having stored therein computer-executable instructions that when executed by the processor cause the integrated circuit to:
communicate a management-packet frame from a wireless access point to a mobile station over a wireless local area network (WLAN) without an established connection between the wireless access point and the mobile station, wherein the management-packet frame contains position data of a Global Positioning System (GPS) satellite and contains a quality estimate of the position data, wherein the quality estimate indicates whether the position data is received directly from the GPS satellite, and wherein the quality estimate indicates a number of data transfers, including at least one or more of the management-packet frames, from the wireless access point to the mobile station since reception of the position data from the GPS satellite by the wireless access point.

8. A method of operating a Wireless Local Access Network (WLAN), the method comprising the steps of:
provifing, within a management-packet frame, position data of a Global Positioning System (GPS) satellite; and
transmitting the management-packet frame to a mobile station from an access point without an established connection between the access point and the mobile station, wherein the management-packet frame contains a quality estimate of the position data, and wherein the quality estimate indicates whether the position data is received directly from the GPS satellite, and wherein the quality estimate indicates a number of data transfers, including at least one or more of the management-packet frames, from the access point to the mobile station since reception of the position data from the GPS satellite by the access point.

9. The method of claim 8, wherein the management-packet frame comprises a beacon frame.

10. The method of claim 9, wherein the beacon frame includes an Information Element to store the position data.

11. The method of claim 8, wherein said WLAN is compliant with a wireless communication protocol.

12. The method of claim 11, wherein the wireless communication protocol is compliant with a version of an Institute for Electrical and Electronic Engineers (IEEE) 802.11 standard.

13. A method of operating a Wireless Local Access Network (WLAN), the method comprising the steps of:
providing, within a management-packet frame, position data of a Global Positioning System (GPS) satellite; and
transmitting the management-packet frame from a first wireless device to a second wireless device without an established connection between the first and second wireless devices, wherein the management-packet frame contains a quality estimate of the position data, and wherein the quality estimate indicates whether the position data is received directly from the GPS satellite, and wherein the quality estimate indicates a number of data transfers, including at least one or more of the management-packet frames, from the first wireless device to the second wireless device since reception of the position data from the GPS satellite by the first wireless device.

14. The method of claim 13, wherein the management-packet frame comprises a beacon frame.

15. The method of claim 14, wherein the beacon frame includes an Information Element to store the position data.

16. The method of claim 13, wherein said WLAN is compliant with a wireless communication protocol.

17. The method of claim 16, wherein the wireless communication protocol is compliant with a version of an Institute for Electrical and Electronic Engineers (IEEE) 802.11 standard.

18. The method of claim 13, wherein the first and second wireless devices comprise mobile stations.

19. The method of claim 13, wherein the first wireless device comprises an access point and the second wireless device comprises a mobile station.

\* \* \* \* \*